(12) United States Patent
Krapels

(10) Patent No.: US 7,232,104 B2
(45) Date of Patent: Jun. 19, 2007

(54) SETTING FOOT COMPRISING A BASE AND A CARRIER OF WHICH THE LEVEL CAN BE SET BY A LIFT MECHANISM WITH AT LEAST ONE SCREW THREAD

(75) Inventor: Jacobus Gijsbert Krapels, Hazerswoude (NL)

(73) Assignee: Stork Gears & Services, B.V., Rotterdam (NL)

( * ) Notice: Subject to any disclaimer, the term of this patent is extended or adjusted under 35 U.S.C. 154(b) by 66 days.

(21) Appl. No.: 10/493,521

(22) PCT Filed: Oct. 24, 2002

(86) PCT No.: PCT/NL02/00679

§ 371 (c)(1),
(2), (4) Date: Sep. 29, 2004

(87) PCT Pub. No.: WO03/036156

PCT Pub. Date: May 1, 2003

(65) Prior Publication Data

US 2005/0061946 A1 Mar. 24, 2005

(30) Foreign Application Priority Data

Oct. 25, 2001 (NL) .................................... 1019237

(51) Int. Cl.
*F16M 1/00* (2006.01)
(52) U.S. Cl. ...................................... 248/677; 248/550
(58) Field of Classification Search ................ 248/677, 248/678, 679, 637, 662, 656, 188.4, 550; 52/731.4
See application file for complete search history.

(56) References Cited

U.S. PATENT DOCUMENTS

| 1,987,726 A | | 1/1935 | Wilkerson et al. |
| 4,061,298 A | | 12/1977 | Kober |
| 4,615,639 A | | 10/1986 | Seireg |
| 5,584,464 A | * | 12/1996 | Whittaker .................... 248/678 |
| 6,116,565 A | * | 9/2000 | Reinke et al. .............. 248/562 |
| 6,437,864 B1 | * | 8/2002 | Watanabe et al. ........... 356/399 |
| 6,889,946 B2 | * | 5/2005 | Bizaj ........................ 248/188.2 |

FOREIGN PATENT DOCUMENTS

| DE | 3512901 A1 * | 10/1986 | ................ 52/731.4 |
| EP | 0 316 283 B1 | 2/1995 | |
| FR | 1 079 461 | 11/1954 | |
| FR | 1 208 157 | 2/1960 | |
| GB | 1 558 101 | 12/1979 | |
| WO | WO 97/35144 | 9/1997 | |

* cited by examiner

*Primary Examiner*—Ramon O Ramirez
(74) *Attorney, Agent, or Firm*—Hoffman & Baron, LLP

(57) ABSTRACT

Setting foot provided with a base and a carrier of which the level can be set with respect to the base by means of a lifting mechanism, in which the base is provided with an axial cylindrical opening having a diameter with internal screw thread, whereas the cylindrical carrier is provided with an external screw thread which cooperates with the internal screw thread of the carrier for the axial setting of the carrier, provided with a lifting mechanism, characterized in that, the coupling device comprises:—a setting bolt with an external screw thread and an outer diameter, and a coupling device between the setting bolt and the carrier;—a hollow (10) along a substantial part of the length of the setting bolt;—a coupling member between the hollow (10) and the setting bolt (13).

18 Claims, 3 Drawing Sheets

SETTING FOOT COMPRISING A BASE AND A CARRIER OF WHICH THE LEVEL CAN BE SET BY A LIFT MECHANISM WITH AT LEAST ONE SCREW THREAD

CROSS-REFERENCE TO RELATED APPLICATIONS

This application is the National Stage of International Application No. PCT/NL02/00679, filed Oct. 24, 2002, which claims the benefit of Netherlands Application No. NL 1019237, filed Oct. 25, 2001, the contents of which is incorporated by reference herein.

FIELD OF THE INVENTION

The invention relates to a setting foot comprising a base and a carrier of which the level can be set by a lift mechanism with at least one screw thread, in which the setting foot is provided with an axial cylindrical opening having a diameter with internal screw thread, whereas the cylindrical carrier is provided with external screw thread which cooperates with the internal screw thread of the setting foot for setting the carrier in axial direction.

A setting foot of this type is known from FR 1.208.157, comprising a setting bolt with external screw thread and an outer diameter, and a coupling device between the carrier and the setting bolt. The coupling device comprises hexagonal surfaces on the setting bolt which contact openings made in the internal wall of the carrier by which the carrier can be screwed up and down. This system is complicated, operates slowly and does not give an easy setting of the level of the carrier. Furthermore, with limited accessibility of the setting foot it is difficult to move the carrier up or down by means of hook spanners.

In shipping and industry, in which internal combustion engines are mounted, it is often a problem that the steel fillings have been pressed in the foundation. This pressing occurs because the bolts have been vibrated loosely or are broken. This removes the clamping force of the setting bolt and the machine is no longer fixedly mounted on the foundation. At most installations the foundation bolts by which the machines are anchored, are difficult to reach, for which reason this problem is rather important. When these fillings have been pressed in the machinery is placed radially lower with respect to the driven machinery, so that the driving shaft of the driven machine can be seriously damaged.

SUMMARY OF THE INVENTION

The object of the inventions is to remove these disadvantages. With regard to the setting of the level this object is reached by providing a setting foot according to the invention, comprising a setting bolt and a coupling device, a hollow along a substantial part of the length of the setting bolt.

A preferred embodiment of the invention is characterized by a coupling member between the hollow and the carrier which is fixedly mounted in the inner side of a smooth central opening having an internal diameter in the carrier; the coupling member comprising a wedge, which wedge extends with a wide fit into the hollow which forms a wedge course into the setting bolt; and in which the inner diameter of the central opening in the carrier is with a wide fit larger than the outer diameter of the setting bolt.

A further embodiment of the invention is characterized in that the carrier is provided with a radial screw bore for a fixing screw bolt, of which the point extends into the hollow in the setting bolt; the wedge course in the setting bolt is open at the lower side for inserting from the upper side in an axial direction; and the wedge course is closed at the upper side of the setting bolt.

As to the security against undesirable change of the level setting the object is reached with a setting foot comprising a base and a carrier, of which the level can be set with respect to the base by means of a lifting mechanism having at least one setting/mounting bolt, characterized in that, means are present for detecting the undesired change of the chosen setting of the mounting/setting bolt.

BRIEF DESCRIPTION OF THE DRAWINGS

The invention will be further elucidated below, referring to the accompanying drawing of some preferred embodiments.

DETAILED DESCRIPTION OF PREFERRED EMBODIMENTS

Figure 1:
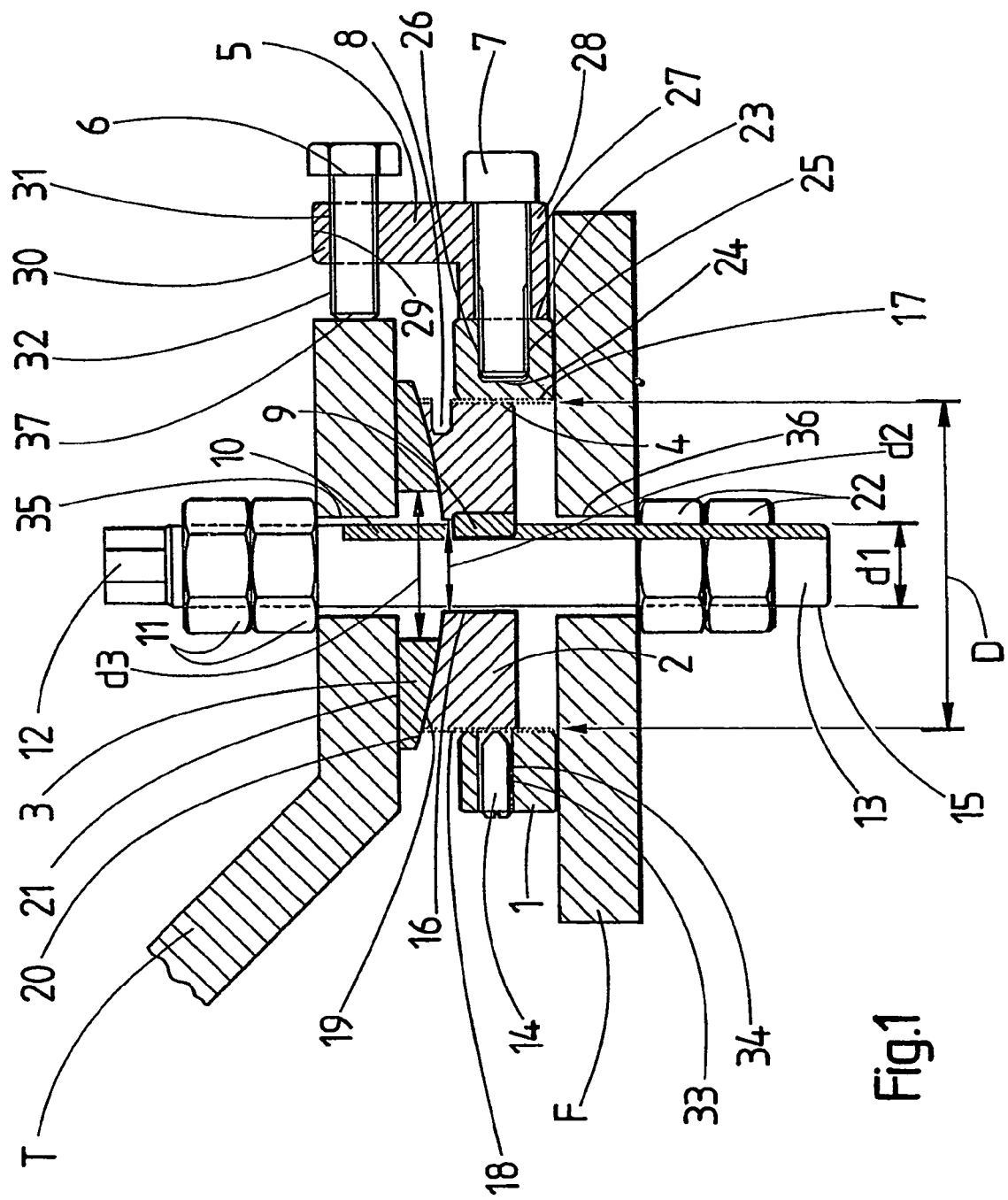
FIG. 1 shows a cross section of a side view of a setting foot provided with a coupling device according to the invention in a partial axial cross section over the setting foot according to the invention.
Figure 2:
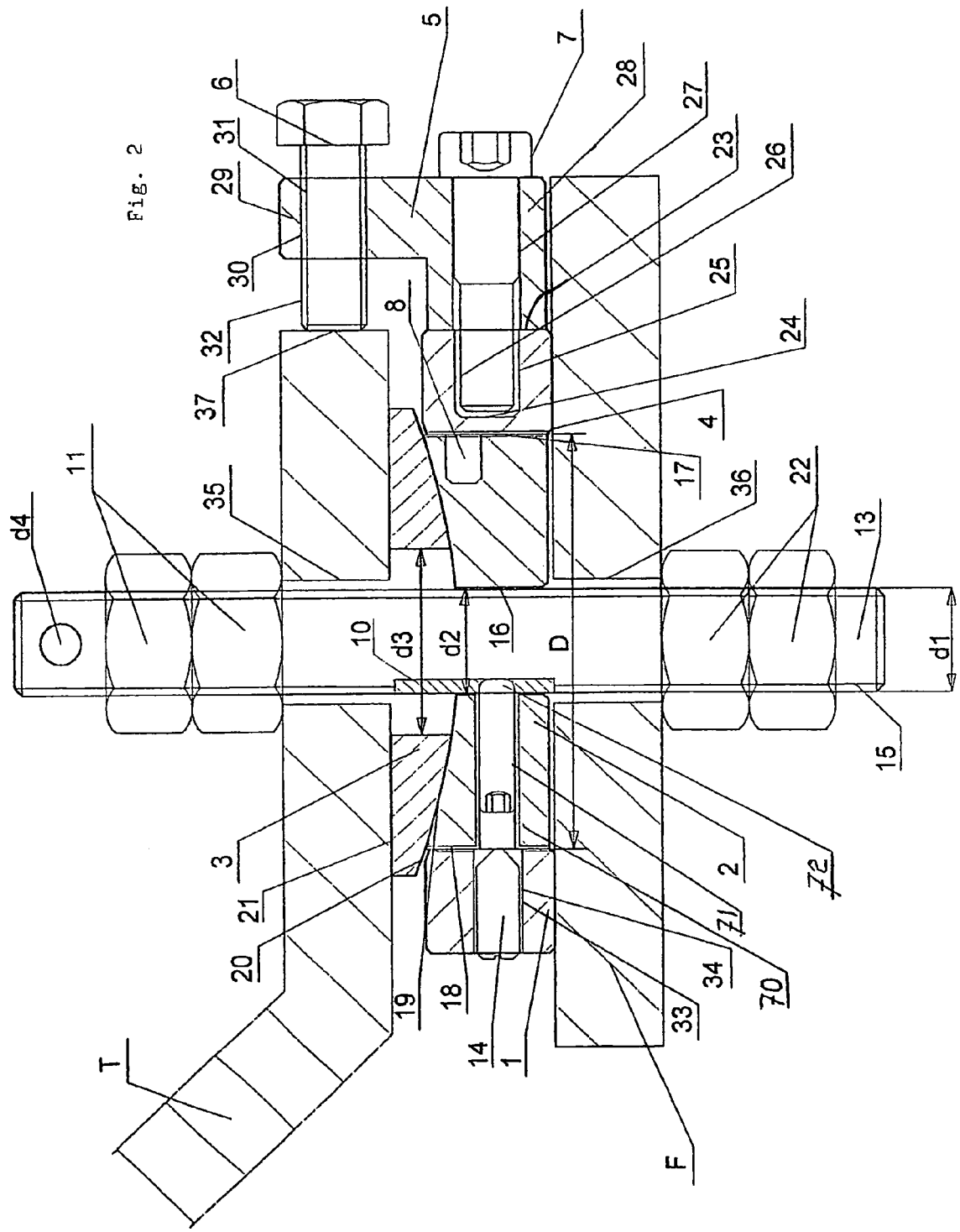
FIG. 2 shows another embodiment of the coupling device having a radial screw bore in the carrier for a fixing screw bolt.

According to FIG. 1 the setting foot comprises a base 1, that can be placed on a foundation F. The base 1 has an axial cylindrical opening 4 having a diameter D with an internal screw thread 17. Furthermore, the a cylindrical carrier 2 is provided, having an external screw thread 18 which cooperates with the internal screw thread 17 of the base for setting the carrier 2 in an axial direction.

This axial setting takes place by means of a lifting mechanism, which comprises a setting bolt 13 with external screw tread 15 and an outer diameter d1; a wedge hollow 10 along a substantial part of the length of the setting bolt 13; and a wedge 9 which is fixedly mounted into the inside of a smooth central opening 16 having an inner diameter d2 in the carrier 2; said wedge 9 extends extending with a wide fit into the wedge hollow 10 in the setting bolt 13; whereas the inner diameter d2 of the central opening 16 in the carrier is with a wide fit larger than the outer diameter d1 of the setting bolt 13.

The carrier dish 2 has a concave upper end face 19; on which a bearing disk 3 rests with a convex bent lower surface 20 having the same radius of curvature as the concave upper end surface 19 of the carrier dish. The bearing disk 3 has a flat upper end face 21. The bearing disk 3 has a central opening with a diameter d3 which surrounds the setting bolt 13 having an outer diameter d1 with a wide play.

The wedge hollow 10 in the setting bolt 13 is open at the lower side for the axial insertion over the wedge 9 from the upper side. The wedge hollow 10 is closed at the upper end of the setting bolt 13. According to an efficient embodiment the setting bolt 13 is provided at its upper end with a hexagonal form 12 for rotational setting, by means of which the carrier dish 2 can be set into a vertical direction inside the base 1.

At a practical embodiment the setting bolt 13 is provided at the upper side with one or more security nuts 11 and the setting bolt 13 is provided at the lower side with one or more security nuts 22.

With this construction a fast vertical accurate setting of the rotating carrier is possible, in that when operating the external hexagonal end 12 the wedge 9 drives the carrier 2. Fixation of the setting position takes place by means of the security nuts 11 and 22.

In a special embodiment of the setting foot according to the invention, the base 1 is provided in its vertical outer wall 23 with one or more horizontal, radial, blind borings 24, provided with internal screw thread 25. In these one or more blind borings 24 the screw thread part 26 of one or more horizontal fixing bolts 7 can be fastened. One or more rectangular setting clamps 5 having a horizontal leg 28 and a vertical leg 29 are provided in the horizontal leg 28 with a smooth bore 27 for fixing bolts 7 which extend with a large fit through the smooth bore and are fastened in the base 1, by means of which the setting clamps are fastened at the outside of the base 1. The one or more setting clamps 5 in the vertical leg 29 are provided near the upper side with a horizontal bore 30 with internal screw thread 31 for receiving the screw thread 32 of a horizontal setting screw 6 for horizontally setting the base 1 with regard to a tool T to be set.

By the application of the setting clamps the position of the tool T can be set accurately in a horizontal direction with regard to the foot, which in its turn is withheld from rotation on a foundation F by means of a small weld (not shown) or another method against rotation.

In practice, it is convenient to provide the base 1 in its vertical outer wall 23 with one or more horizontal, radial, continuous bores 33, provided with internal screw thread 34 for one or more security and/or level indicating screws 14.

Not withstanding the limited accessibility it may be useful in some cases, that the carrier 2 is provided in its outer wall with one or more horizontal, radial hollows 8 for the level setting of the carrier 2 by means of spanners.

When using the setting foot according to the invention, it is placed with its base 1 on a foundation F, in which the tool T to be set is placed on the baring disk 3 of the setting foot 1, whereas the setting bolt 13 extends through two superimposed, aligned holes 36, 35 in the foundation F and the tool T respectively, and a setting screw 6 is turned against the side wall 37 of the tool T to be set.

Figure 3:
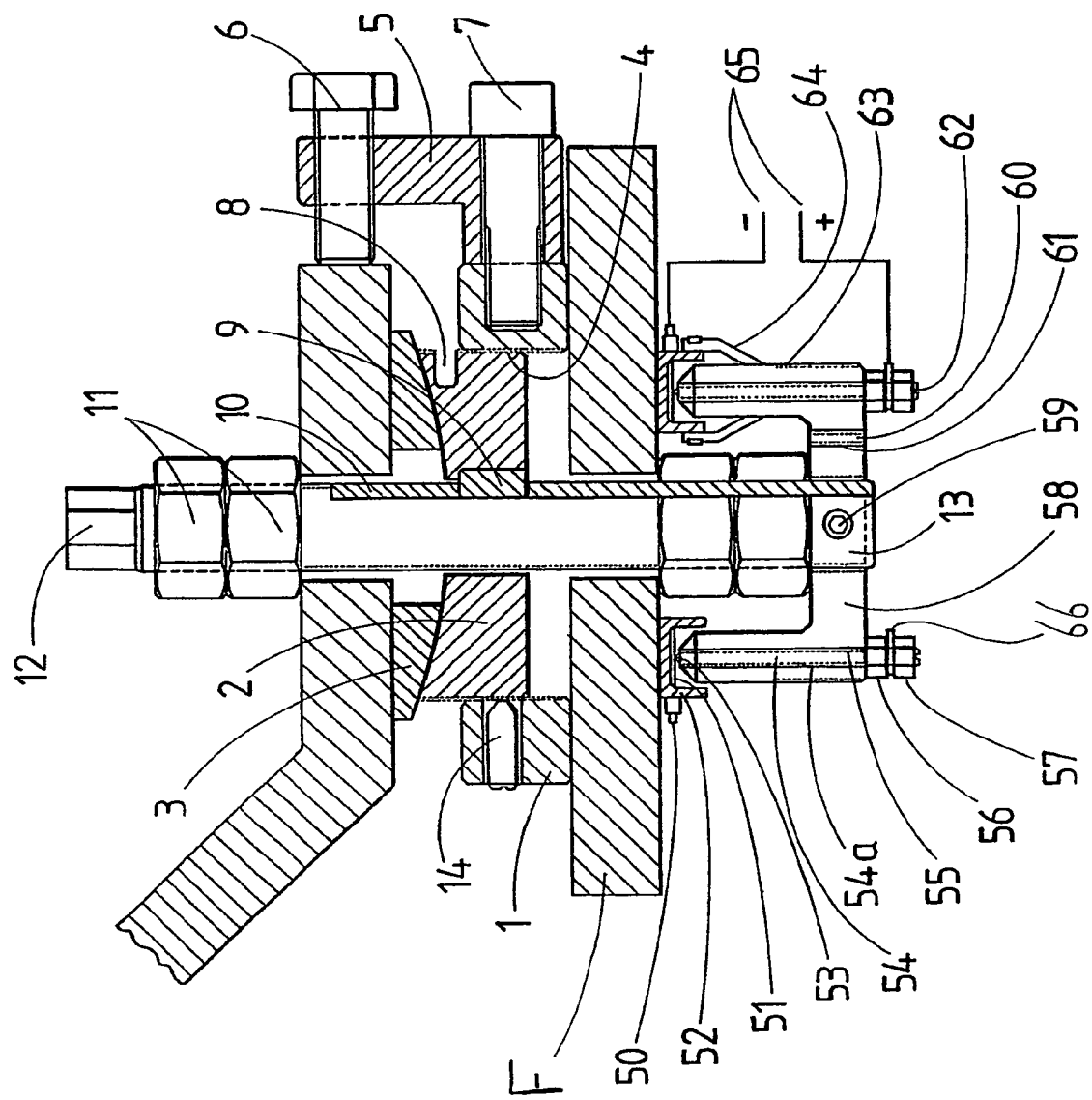
FIG. 3 shows, in a same side view as FIG. 1, a setting foot comprising an electrical security system with alarm for detecting when the setting changes undesirably.

FIG. 3 shows the electrical security device against undesired change of the setting of the setting foot, which is provided with a base 1 and a carrier 2 of which the level can be set with regard to the base by means of a lifting mechanism, preferably that according to FIG. 1. According to a preferred embodiment of the security device there are means present for detecting the chosen setting of the mounting/setting bolt 13. The detection means comprise electrical sensors.

These electrical sensors comprise a non-conducting ring shaped, electrically isolating cover having U-shaped cross section 58 which is connected in the middle of its horizontal bottom with the lower end of the setting/mounting bolt 13; a number of electrically conductive contact rods 54 which are distributed around the circumference of the bottom lid 58 and can be set in a vertical direction in the side wall of the lid 58; and a number of electrically conductive contact plates 51 of which the number corresponds with the number of contact rods 54, of which contact plates 51 the lower side connects with the upper side of the contact rods 54 for the formation of a disconnectable electrical connection. The contact rods 54 are fastened by nuts 56, 57 in the isolating lid 58 whereas between these nuts a contact ring 66 is placed for closing the electrical circuit.

Furthermore, the contact rods 54 are provided at the outer end with an open hollow or an otherwise shaped hollow, such as a hexagonal hollow 62 for setting the contact rod by rotation. Preferably the electrically conductive contact plates 51 are integrated in the bottom of a ring shaped isolator 52 which has in cross section an inverted U-shape, which isolator 52 is attached to the lower side of a foundation plate (F).

According to a preferred embodiment the contact plates 51 and the contact rods 54 are part of an electrical circuit 65, which is coupled with an alarm circuit.

The isolating lid 58 is provided in its side wall with a number of screw bores 54a for the electrically conducting contact rods 54 with corresponding outer screw thread for setting in a vertical direction.

Furthermore, the ring shaped isolator 52 is provided at the outer side with an electrical connection 50, which is connected to the contact plates 51 which connection is adapted for making contact by means an operating member, such as a screw driver or hexagonal spanner.

The isolating lid 58 is provided with an external screw thread 63 for the mounting of a fluid tight protection member with cable throughput.

The invention claimed is:

1. Setting foot comprising a base (1) and a cylindrical carrier (2), of which the level with regard to the base (1) can be set by a lift mechanism with at least one screw thread, in which the base (1) is provided with an axial cylindrical opening (4) with a diameter (D) with internal screw thread (17), whereas the cylindrical carrier (2) is provided with external screw thread (18) which cooperates with the internal screw thread (17) of the base (1) for setting the carrier (2) in an axial direction, comprising a setting bolt (13) with external screw thread (15) and an outer diameter (d1), and a coupling device between the carrier (2) and the setting bolt (13), wherein
   a hollow (10) extends over a substantial part of the length of the setting bolt (13).

2. Setting foot according to claim 1, wherein the coupling device comprises
   a wedge (9) which is fixedly fastened in the inside of a smooth central opening (16) having an inner diameter (d2) in the carrier (2);
   said wedge (9) extending with a loose fit into the hollow (10) in the setting bolt (13);
   in which the inner diameter (d2) of the central opening (16) in the carrier is with a loose fit larger than the outer diameter (d1) of the setting bolt (13).

3. Setting foot according to claim 1, wherein
   a) the hollow (10) in the setting bolt (13) is open at the lower side for inserting from above over the wedge (9); and
   b) the hollow (10) is closed at the upper side of the setting bolt (13).

4. Setting foot according to claim 1, wherein the carrier (2) is provided with a radial screw bore (70) for a fixing screw bolt (71) of which the point (72) extends into a short hollow (10) in the setting bolt (13) with closed ends.

5. Setting foot according to claim 1, wherein the setting bolt (13) is provided at the upper end with a hexagonal form (12) for rotational setting, by means of which the cylindrical carrier disk (2) is settable in a vertical direction in the base (1).

6. Setting foot according to claim 1, wherein
a) the base (1) is provided in its vertical outer wall (23) with one or more horizontal, radial, blind bores (24), provided with internal screw thread;
b) in these one or more blind bores (24) the screw thread part (26) of one or more horizontal fastening bolts (7) can be fixed;
c) one or more rectangular setting clamps (5) have been provided in the horizontal leg (28) with a smooth bore (27) for fastening bolts (7), which extend through the smooth bore with a loose fit and are fixed in the base (1), by means of which these setting clamps (5) are fastened to the outside of the base (1); and
d) the one or more setting clamps (5) are provided in the vertical leg (29) near the upper side with a horizontal bore (30) having internal screw thread (31) for receiving the external screw thread (32) of a horizontal setting screw (6) for setting a tool (T) to be set with regard to the base (1).

7. Setting foot according to claim 1, wherein the base (1) is provided in its vertical outer wall (23) with one or more horizontal, radial, through going bores (33), provided with internal screw thread (34) for one or more security and/or level indicating screws (14).

8. Setting foot according to claim 1, wherein the carrier (2) has been provided in its vertical outer wall with one or more horizontal, radial hollows (8) for setting the level of the carrier (2) by means of spanners.

9. Setting foot comprising a base (1) and a carrier (2) which can be set in a vertical direction with regard to the base (1) by means of a lifting mechanism having at least one mounting/setting bolt (13),
wherein means are present for detecting undesired changes of the chosen setting of the mounting/setting bolt (13),
wherein the detection means comprise electrical sensors and
wherein the electrical sensors comprise:
a) a ring shaped, electrically isolating lid (58) having an inverted U shaped cross section, which is mounted in the middle of its horizontal bottom to the lower end of the setting/mounting bolt (13);
b) a number of electrically conductive contact rods (54) which are distributed around the circumference of the bottom wall of the lid (58) and are settable in a vertical direction (54*a*) in the side wall of the lid (58); and
c) a number of electrical conductive contact plates (51) of which the number corresponds with the number of contact rods (54), against which contact plates (51) the upper ends of the contact rods (54) contact for making a disconnectable electrical connection.

10. Setting foot according to claim 9, wherein the electrically conductive contact plates (51) are received into the bottom of a ring shaped isolator (52) of which the cross section has an inverted U shape, which isolator is fastened to the bottom side of a foundation plate (F).

11. Setting foot according to claim 10, wherein the ring shaped isolator (52) is provided at the outer side with an electrical connection (50), which is connected to the contact plates (51), which connection is adapted for operation by means of an operating member, such as a screw driver or hexagonal spanner.

12. Setting foot according to claim 9, wherein the contact plates (51) and the contact rods (54) are part of an electrical circuit (65).

13. Setting foot according to claim 12, wherein the electrical circuit (65) is coupled with an alarm circuit.

14. Setting foot according to claim 12, wherein the contact rods (54) are fastened in the isolating lid (58) with nuts (56, 57), whereas between these nuts a contact ring (66) is present for closing the electrical circuit.

15. Setting foot according to claim 9, wherein the isolating lid (58) is provided in its side wall with a number of screw bores (54*a*) for the vertical setting of the electrically conductive contact rods (54) having a corresponding external screw thread.

16. Setting foot according to claim 9, wherein the contact rods (54) are provided at the outer side with an open hollow, such as a hexagonal hollow (62) for the setting of the contact rod (54) by turning by means of an operating member, such as a screw driver or a hexagonal spanner.

17. Setting foot according to claim 9, wherein the isolating lid (58) is provided with a screw bore (61) for the removal of a condensate or an other liquid, which can be closed by a screw stopper (60).

18. Setting foot according to claim 9, wherein the isolating lid (58) is provided with an external screw thread (63) for screwing on a fluid tight protection cap with cable throughput.

* * * * *